(12) United States Patent
Wu et al.

(10) Patent No.: US 11,757,794 B2
(45) Date of Patent: Sep. 12, 2023

(54) PORT CONFIGURATION METHOD AND COMMUNICATIONS DEVICE

(71) Applicant: Huawei Technologies Co., Ltd., Shenzhen (CN)

(72) Inventors: Xinggui Wu, Nanjing (CN); Yue Yin, Nanjing (CN); Heyang Liu, Nanjing (CN); Liyang Sun, Nanjing (CN); Hewen Zheng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/013,120

(22) Filed: Sep. 4, 2020

(65) Prior Publication Data
US 2020/0403938 A1 Dec. 24, 2020

Related U.S. Application Data

(63) Continuation of application No. PCT/CN2019/075879, filed on Feb. 22, 2019.

(30) Foreign Application Priority Data

Mar. 5, 2018 (CN) .......................... 201810180519.0

(51) Int. Cl.
*H04L 49/253* (2022.01)
*H04L 41/085* (2022.01)
(Continued)

(52) U.S. Cl.
CPC .......... *H04L 49/253* (2013.01); *H04L 41/085* (2013.01); *H04L 45/74* (2013.01); *H04L 61/5007* (2022.05); *H04L 61/5038* (2022.05)

(58) Field of Classification Search
CPC ..... H04L 41/0806; H04L 41/12; H04L 49/35; H04L 49/356; H04L 45/02; H04L 49/70;
(Continued)

(56) References Cited

U.S. PATENT DOCUMENTS 8,923,277 B1 * 12/2014 Shekhar ................. H04L 49/10
709/224
9,571,337 B1 * 2/2017 Xu ....................... H04L 41/0803
(Continued)

FOREIGN PATENT DOCUMENTS

CN 103401851 A 11/2013
CN 105786578 A 7/2016
(Continued)

OTHER PUBLICATIONS

Lindem, A. et al., "BGP Logical Link Discovery Protocol (LLDP) Peer Discovery," draft-acee-idr-lldp-peer-discovery-01.txt, Jul. 3, 2017, 16 pages.

*Primary Examiner* — Djenane M Bayard
(74) *Attorney, Agent, or Firm* — Slater Matsil, LLP

(57) ABSTRACT

This application provides a port configuration method and a communications device. The method includes: obtaining, by a first communications device, an identifier of a second port group of a second communications device, where the identifier of the second port group is used to indicate configuration information of a first port of the first communications device, and establishing, by the first communications device, a connection to a second port in the second port group by using the first port, where the first port is any port of the first communications device, the second port is any port in the second port group, and the configuration information includes an internet protocol IP address; determining, by the first communications device, the configuration information of the first port based on the identifier of the second port group; and configuring, by the first communications device, the configuration information for the first port.

20 Claims, 4 Drawing Sheets

(51) Int. Cl.
  *H04L 45/74* (2022.01)
  *H04L 61/5007* (2022.01)
  *H04L 61/5038* (2022.01)

(58) Field of Classification Search
  CPC ............... H04L 63/101; H04L 12/4625; H04L 12/4641; H04L 41/0846; H04L 49/257; H04L 49/30; H04L 41/0893; H04L 12/462; H04L 67/34; H04L 12/4604; H04L 12/66; H04L 45/245; H04L 45/38; H04L 61/2015; H04L 67/1097; H04L 41/02; H04L 43/04; H04L 45/54; H04L 45/74; H04L 45/745; H04L 67/10; H04L 12/18; H04L 12/1854; H04L 12/6418; H04L 41/0659; H04L 41/0681; H04L 41/0813; H04L 41/0853; H04L 41/0876; H04L 41/0886; H04L 41/20; H04L 41/22; H04L 41/24; H04L 43/062; H04L 43/12; H04L 45/34; H04L 45/50; H04L 45/586; H04L 45/64; H04L 45/66; H04L 49/1515; H04L 49/201; H04L 49/25; H04L 49/3072; H04L 49/357; H04L 61/103; H04L 61/20; H04L 61/2069; H04L 61/6022; H04L 67/12; H04L 67/16; H04L 69/22; H04L 69/324; H04L 12/54; H04L 25/14; H04L 41/085; H04L 45/04; H04L 45/28; H04L 45/56; H04L 49/253; H04L 61/2007; H04L 61/2038; H04L 61/2514; H04L 63/08; H04L 65/1069; H04L 61/2517; H04L 12/4633; H04L 65/1006; H04L 29/06; H04L 47/20; H04L 63/10; H04L 29/06027; H04L 63/0236; H04L 63/20; H04L 69/08; H04L 63/02; H04L 47/10; H04L 49/351; H04L 12/5601; H04L 2101/622; H04L 49/90; H04L 49/901; H04L 2101/663; H04L 47/125; H04L 47/43; H04L 49/109; H04L 47/15; H04L 47/50; H04L 47/623; H04L 2012/5621; H04L 45/583; H04L 47/266; H04L 47/522; H04L 49/108; H04L 49/552; H04L 49/606; H04L 61/5014; H04L 2101/604; H04L 47/263; H04L 47/30; H04L 49/3009; H04L 49/354; H04L 61/5007; H04L 49/352; H04L 46/109; H04L 2212/00; H04L 61/5038; H04L 12/46; H04L 61/10; H04L 61/4511; H04L 12/413; H04L 43/0876; H04L 43/16; H04L 45/306; H04L 61/256; H04L 61/2575; H04L 67/1014; H04L 67/1023; H04L 67/146; H04L 67/562; H04L 43/00; H04L 43/08; H04L 43/0823; H04L 63/0227; H04L 63/0272; H04L 63/029; H04L 63/0876; H04L 67/02; H04L 69/18; Y02D 30/00

See application file for complete search history.

(56) References Cited

U.S. PATENT DOCUMENTS

| | | | |
|---|---|---|---|
| 2002/0085586 A1* | 7/2002 | Tzeng | H04L 49/108 370/389 |
| 2002/0124107 A1 | 9/2002 | Goodwin | |
| 2005/0044199 A1 | 2/2005 | Shiga et al. | |
| 2005/0163118 A1 | 7/2005 | Steindl | |
| 2005/0213608 A1 | 9/2005 | Modi et al. | |
| 2006/0274774 A1 | 12/2006 | Srinivasan et al. | |
| 2007/0129015 A1* | 6/2007 | Iwamoto | H04L 12/2854 455/41.2 |
| 2008/0186875 A1* | 8/2008 | Kitani | H04L 49/65 370/254 |
| 2010/0061242 A1* | 3/2010 | Sindhu | H04L 49/35 370/235 |
| 2010/0290473 A1* | 11/2010 | Enduri | H04L 49/357 370/395.53 |
| 2014/0280791 A1 | 9/2014 | Decusatis et al. | |
| 2015/0172098 A1 | 6/2015 | Agarwal et al. | |
| 2019/0028408 A1* | 1/2019 | Suzuki | H04L 49/9005 |
| 2019/0123934 A1* | 4/2019 | Magganmane | H04L 61/6063 |
| 2019/0273718 A1* | 9/2019 | Ahuja | H04L 63/0236 |
| 2020/0288453 A1* | 9/2020 | Zhang | H04W 72/12 |

FOREIGN PATENT DOCUMENTS

| | | |
|---|---|---|
| CN | 105812167 A | 7/2016 |
| CN | 106059822 A | 10/2016 |
| CN | 106464654 A | 2/2017 |
| CN | 107547242 A | 1/2018 |
| CN | 104471897 B | 2/2018 |
| CN | 107710700 A | 2/2018 |
| EP | 2779531 A2 | 9/2014 |
| JP | 2011078039 A | 4/2011 |
| WO | 2013150601 A1 | 10/2013 |
| WO | 2016137820 A1 | 9/2016 |

* cited by examiner

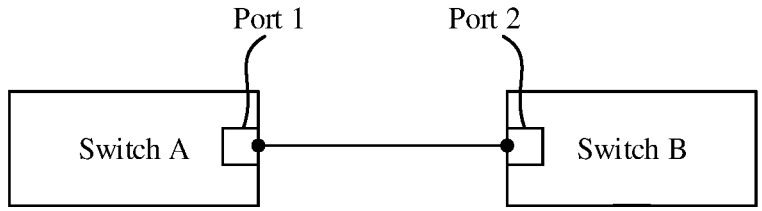

FIG. 1

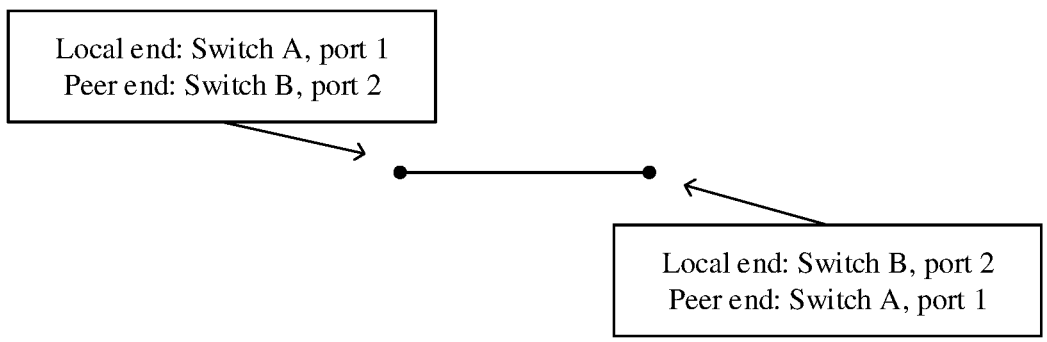

| A first communications device obtains an identifier of a second port group of a second communications device, where the identifier of the second port group is used to indicate configuration information of a first port of the first communications device, and the first communications device establishes a connection to a second port in the second port group by using the first port, where the first port is any port of the first communications device, the second port is any port in the second port group, and the configuration information includes an internet protocol IP address | ∿S310 |

| The first communications device determines the configuration information of the first port based on the identifier of the second port group | ∿S320 |

| The first communications device configures the configuration information for the first port | ∿S330 |

FIG. 3

PORT CONFIGURATION METHOD AND COMMUNICATIONS DEVICE

CROSS-REFERENCE TO RELATED APPLICATIONS

This application is a continuation of International Application No. PCT/CN2019/075879, filed on Feb. 22, 2019, which claims priority to Chinese Patent Application No. 201810180519.0, filed on Mar. 5, 2018. The disclosures of the aforementioned applications are hereby incorporated by reference in their entireties.

TECHNICAL FIELD

This application relates to the communications field, and more specifically, to a port configuration method and a communications device in the communications field.

BACKGROUND

Data centers expand, increasingly more data centers start deploying a layer-3 network, and use an external border gateway protocol (EBGP) on the layer-3 network to implement route transmission. On the layer-3 network, when a connection is established between two switches, IP addresses need to be configured for ports configured to connect two ends. In other words, the internet protocol (IP) addresses of the ports used to connect the two switches need to be configured, and the IP addresses configured for the ports configured to connect the two ends are deployed on a same subnet, to implement port interconnection of the two ends.

In an existing deployment procedure of the data center, during network planning, a network designer needs to plan two ports on two specific switches that need to be connected. Network deployment personnel are responsible for respectively attaching, based on network planning, labels to two ends of a network cable that connects the two switches. The label at each end indicates a switch identifier and a port number of a local end, and a switch identifier and a port number of a peer end. The two switches are connected based on the labels on the network cable. Network O&M personnel configure IP addresses on the same subnet for the two ports based on the ports configured during network planning to connect the two ends.

However, as quantities of switches and ports in the data center increase, a connection error may occur when the network deployment personnel connect the ports of the two switches, and consequently a route between the two switches may not properly work.

SUMMARY

This application provides a port configuration method and a communications device, to avoid a problem that a route between two communications devices cannot properly work because an error occurs in ports through which the two communications devices are manually connected.

According to a first aspect, this application provides a port configuration method, and the method includes: obtaining, by a first communications device, an identifier of a second port group of a second communications device, where the identifier of the second port group is used to indicate configuration information of a first port of the first communications device, and establishing, by the first communications device, a connection to a second port in the second port group by using the first port, where the first port is any port of the first communications device, the second port is any port in the second port group, and the configuration information includes an internet protocol IP address; determining, by the first communications device, the configuration information of the first port based on the identifier of the second port group; and configuring, by the first communications device, the configuration information for the first port.

According to the port configuration method provided in this embodiment of this application, the first communications device may obtain the identifier of the second port group of the second communications device. The identifier of the second port group is used to indicate the configuration information of the first communications device. The first communications device establishes the connection to the second port in the second port group by using the first port. The first port is any port of the first communications device, and the second port is any port in the second port group. The first communications device determines the configuration information of the first port based on the identifier of the second port group, and configures the configuration information for the first port. Therefore, this can avoid a problem that a route between two communications devices cannot properly work because an error occurs in ports through which the two communications devices are manually connected.

To be specific, in a network planning phase, a network designer only needs to plan a connection relationship between communications devices, and does not need to specify a connection relationship between ports. Correspondingly, in a network deployment phase, network deployment personnel only need to ensure that switches are correctly connected, and does not need to concern about whether ports used for connecting the switches are correctly connected. Therefore, this can avoid the problem that a route between two communications devices cannot properly work because an error occurs in ports through which the two communications devices are manually connected.

It should be understood that the first communications device and the second communications device each may be any communications device that needs to establish a connection to another communications device through a port configuration. This embodiment of this application imposes no limitation thereto.

For example, the first communications device and/or the second communications device each may be a switch type device (for example, a switch) or a non-switch type device (for example, a server).

It should be understood that the first communications device may include at least one port, and the at least one port of the first communications device may be grouped into at least one port group. The first communications device can configure an identifier of each of the at least one port group and information (such as a port number) about a port included in the port group.

Similarly, the second communications device may include at least one port, and the at least one port of the second communications device may also be grouped into at least one port group.

It should be further understood that the port group (including a first port group or the second port group) in this embodiment of this application may include one or more ports.

Optionally, an identifier of the port group of the first communications device may be understood as a logical identifier of the first communications device.

In other words, the first communications device can configure the logical identifier of the first communications device and a port corresponding to the logical identifier, that is, a port for which the logical identifier is valid.

For example, the first communications device includes three logical identifiers: a logical identifier 111, a logical identifier 112, and a logical identifier 113. The logical identifier in corresponds to a port 1 to a port 4, the logical identifier 112 corresponds to a port 5 to a port 8, and the logical identifier 113 corresponds to a port 9 and a port 10.

Optionally, when the first communications device includes only one port group, an identifier of the port group may be the logical identifier of the first communications device, a device identifier of the first communications device (for example, a physical identifier of the first communications device), or another existing field or newly added field that can uniquely identify the first communications device. This embodiment of this application imposes no limitation thereto.

It should be understood that, that the first communications device establishes the connection to the second port in the second port group by using the first port may mean that the first port of the first communications device is connected to the second port of the second communications device by using a network cable, or the first communications device establishes a physical connection to the second communications device.

With reference to the first aspect, in a first implementation of the first aspect, the determining, by the first communications device, the configuration information of the first port based on the identifier of the second port group includes: determining, by the first communications device, the configuration information of the port based on the identifier of the second port group and a preconfigured first mapping relationship, where the first mapping relationship is used to indicate a correspondence between the identifier of the second port group and the configuration information.

Specifically, the first communications device may preconfigure at least one mapping relationship. Each of the at least one mapping relationship is used to indicate a correspondence between an identifier of a port group at a peer end and a port configuration of a local end. The at least one mapping relationship includes the first mapping relationship. The first communications device queries and matches in the at least one mapping relationship based on the identifier of the second port group, to find a port configuration corresponding to the identifier of the second port group. The port configuration is the configuration information of the first port.

It should be understood that a port configuration in this embodiment of this application is also referred to as configuration information of a port.

It should be further understood that the mapping relationship preconfigured by the first communications device may be a logical node preconfigured by the first communications device. The logical node is not valid initially for a specific port in the first communications device, but a condition that a port at the peer end matching the logical node needs to meet (for example, an identifier/a logical identifier of a port group to which the port at the peer end matching the logical node belongs) and the port configuration (for example, an IP address) at the local end are specified.

Correspondingly, after the first port is connected to the second port, the first communications device may obtain the identifier (a logical identifier) of the second port group of the second communications device; search, based on the identifier of the second port group, a local configuration for a logical node that matches the identifier of the second port group; and adapt a port configuration in the logical node to the first port.

In other words, the first communications device can configure the logical node; configure the configuration information such as a to-be-adapted port configuration of a port at the local end in the logical node (which is directly configured on a specific port in the prior art); and specify an identifier (or a logical identifier) of a port group at the peer end.

With reference to the first aspect, in a second possible implementation of the first aspect, the first communications device includes at least one port group, the at least one port group includes a first port group, the first port is any port in the first port group, and the determining, by the first communications device, the configuration information of the first port based on the identifier of the second port group includes: determining, by the first communications device, the configuration information based on the identifier of the second port group and an identifier of the first port group.

According to the port configuration method provided in this embodiment of this application, the configuration information of the first port of the first communications device is not initially configured on a specific port. However, the logical identifier of the second communications device is obtained; then the logical node in the local configuration is matched based on the logical identifier; and the port configuration configured on the logical node is used as the configuration information of the first port, thereby avoiding a problem of a layer 2 interworking failure caused because ports at two ends are not in a same subnet when a port configuration does not correspond to a physical connection.

With reference to the second possible implementation of the first aspect, in a third possible implementation of the first aspect, the determining, by the first communications device, the configuration information based on the identifier of the second port group and an identifier of the first port group includes: determining, by the first communications device, the configuration information based on the identifier of the second port group, the identifier of the first port group, and a preconfigured second mapping relationship, where the second mapping relationship is used to indicate a correspondence between the identifier of the second port group, the identifier of the first port group, and the configuration information.

Specifically, the first communications device may preconfigure at least one mapping relationship. Each of the at least one mapping relationship is used to indicate a correspondence between an identifier of a port group at a peer end, an identifier of a port group at a peer end, and a port configuration of a local end. The at least one mapping relationship includes the second mapping relationship. The first communications device queries and matches in the at least one mapping relationship based on the identifier of the second port group and the identifier of the first port group, to find a port configuration corresponding to both the identifier of the second port group and the identifier of the first port group. The port configuration is the configuration information of the first port.

It should be further understood that the mapping relationship preconfigured by the first communications device may be a logical node preconfigured by the first communications device. The logical node is not valid initially for a specific port in the first communications device, but a condition that a port at a peer end matching the logical node needs to meet (for example, an identifier/a logical identifier of a port group to which the port at the peer end matching the logical node belongs), a port at the local end, and the port configuration (for example, an IP address) at the local end are specified.

Correspondingly, after the first port is connected to the second port, the first communications device may obtain the identifier (the logical identifier) of the second port group of the second communications device; search, based on the identifier of the first port group to which the first port belongs and the identifier of the second port group, a local configuration for a logical node that matches the identifier of the first port group and the identifier of the second port group; and adapt a port configuration in the logical node to the first port.

In other words, the first communications device can configure the logical node; configure, in the logical node, the configuration information that is directly configured on a specific port previously, such as a to-be-adapted port configuration of the port at the local end; and specify an identifier (or a logical identifier) of a port group at the peer end.

According to the port configuration method provided in this embodiment of this application, the configuration information of the first port of the first communications device is not initially configured on a specific port. However, the logical identifier of the second communications device is obtained; then the logical node in the local configuration is matched based on the logical identifier; and the port configuration configured on the logical node is used as the configuration information of the first port, thereby avoiding a problem of a layer 2 interworking failure caused because ports at two ends are not in a same subnet when a port configuration does not correspond to a physical connection.

Optionally, the second communications device may include at least one port, and the at least one port of the second communications device may be grouped into at least one port group. The at least one port group includes the second port group. The second communications device can configure an identifier of each of the at least one port group and information (such as a port number) about a port included in the port group.

With reference to the second or the third possible implementation of the first aspect, in a fourth possible implementation of the first aspect, when the first communications device includes only the first port group, the identifier of the first port group is an identifier of the first communications device.

Optionally, the identifier of the first port group may be the logical identifier of the first communications device, a device identifier of the first communications device (that is, a physical identifier of the first communications device), or another existing field or newly added field that can uniquely identify the first communications device. This embodiment of this application imposes no limitation thereto.

With reference to any one of the first aspect, or the first to the fourth possible implementations of the first aspect, in a fifth possible implementation of the first aspect, the obtaining, by a first communications device, an identifier of a second port group of a second communications device includes: receiving, by the first communications device, indication information sent by the second communications device, where the indication information is used to indicate the identifier of the second port group.

Optionally, the first communications device may obtain the identifier of the second port group of the second communications device in a plurality of manners. This embodiment of this application imposes no limitation thereto.

In a possible implementation, the first communications device may receive indication information from the second communications device, where the indication information is used to indicate the identifier of the second port group.

In other words, the first communications device can receive, after being connected to the port at the peer end, the identifier (or the logical identifier) of the port group sent by the peer end. Correspondingly, the first communications device can further send, to the peer end by using the port at the local end, an identifier (or a logical identifier) of a port group to which the port at the local end belongs.

It should be understood that, after establishing the connection to the second communications device, the first communications device may exchange identifiers (or logical identifiers) of port groups by using an underlying protocol.

Optionally, the underlying protocol may be an existing protocol such as an LLDP protocol or a MAC protocol, or may be a newly added protocol. This embodiment of this application imposes no limitation thereto.

For example, the indication information may be carried in a device identifier field in a link layer discovery protocol LLDP packet or a reserved field in the LLDP packet.

In another possible implementation, the first communications device may receive indication information from another communications device, where the indication information is used to indicate the identifier of the second port group, and the another communications device is configured to manage the first communications device and the second communications device.

In still another possible implementation, the first communications device may determine the identifier of the second port group based on a preconfigured third mapping relationship, where the third mapping relationship is used to indicate a correspondence between the identifier of the first port group and the identifier of the second port group.

In other words, the preconfigured third mapping relationship indicates that a physical connection between the first communications device and the second communications device is established by using a port in the first port group of the first communications device and a port in the second port group of the second communications device.

Optionally, the first communications device may further respectively configure a specific port in a port group in the first communications device and a specific port in a port group in another communications device through which a physical connection is established between the first communications device and the another communications device. This embodiment of this application imposes no limitation thereto.

With reference to the fifth possible implementation of the first aspect, in a sixth possible implementation of the first aspect, the indication information is carried in a device identifier field in a link layer discovery protocol LLDP packet or a reserved field in the LLDP packet.

According to a second aspect, this application provides a port configuration method, and the method includes: generating, by a second communications device, indication information, where the indication information is used to indicate an identifier of a second port group; establishing, by the second communications device, a connection to a first port of a first communications device by using a second port in the second port group, where the identifier of the second port group is used to indicate configuration information of the first port of the first communications device, the first port is any port of the first communications device, the second port is any port in the second port group, and the configuration information includes an internet protocol IP address; and sending, by the second communications device, the indication information to the first communications device.

According to the port configuration method provided in this embodiment of this application, the second communications device sends the indication information to the first communications device, where the indication information is used to indicate the identifier of the second port group; the second communications device establishes the connection to the first port of the first communications device by using the second port in the second port group, where the identifier of the second port group is used to indicate the configuration information of the first port of the first communications device, the first port is any port of the first communications device, and the second port is any port in the second port group, so that the first communications device may determine the configuration information of the first port based on the identifier of the second port group. Therefore, this can avoid a problem that a route between two communications devices cannot properly work because an error occurs in ports through which the two communications devices are manually connected.

It should be understood that the first communications device and the second communications device each may be any communications device that needs to establish a connection to another communications device through a port configuration. This embodiment of this application imposes no limitation thereto.

For example, the first communications device and/or the second communications device each may be a switch type device (for example, a switch) or a non-switch type device (for example, a server).

It should be understood that the second communications device may include at least one port, and the at least one port of the second communications device may be grouped into at least one port group. The second communications device can configure an identifier of each of the at least one port group and information (such as a port number) about a port included in the port group.

Similarly, the first communications device may include at least one port, and the at least one port of the first communications device may also be grouped into at least one port group.

It should be further understood that the port group (including a first port group or the second port group) in this embodiment of this application may include one or more ports.

Optionally, the identifier of the port group of the second communications device may be understood as a logical identifier of the second communications device.

In other words, the second communications device can configure the logical identifier of the second communications device and a port corresponding to the logical identifier, that is, a port for which the logical identifier is valid.

With reference to the second aspect, in a first possible implementation of the second aspect, the second communications device includes at least one port group, and the at least one port group includes the second port group.

With reference to the first possible implementation of the second aspect, in a second possible implementation of the second aspect, when the second communications device includes only the second port group, the identifier of the second port group is an identifier of the second communications device.

Optionally, when the second communications device includes only one port group, an identifier of the port group may be the logical identifier of the second communications device, a device identifier of the second communications device (for example, a physical identifier of the second communications device), or another existing field or newly added field that can uniquely identify the second communications device. This embodiment of this application imposes no limitation thereto.

With reference to any one of the second aspect, or the first or the second possible implementation of the second aspect, in a third possible implementation of the second aspect, the indication information is carried in a device identifier field in a link layer discovery protocol LLDP packet or a reserved field in the LLDP packet.

It should be understood that, that the second communications device establishes the connection to the first port of the first communications device by using the second port in the second port group may mean that the second port of the second communications device is connected to the first port of the first communications device by using a network cable, or the second communications device establishes a physical connection to the first communications device.

It should be understood that, after being connected to a port at a peer end, the second communications device can send, to the peer end by using a port at a local end, an identifier (or a logical identifier) of a port group to which the port at the local end belongs. Correspondingly, the second communications device can further receive an identifier (or a logical identifier) of a port group sent by the peer end.

It should be understood that, after establishing the connection to the first communications device, the second communications device may exchange identifiers (or logical identifiers) of port groups by using an underlying protocol.

Optionally, the underlying protocol may be an existing protocol such as an LLDP protocol or a MAC protocol, or may be a newly added protocol. This embodiment of this application imposes no limitation thereto.

For example, the indication information may be carried in a device identifier field in a link layer discovery protocol LLDP packet or a reserved field in the LLDP packet.

According to a third aspect, this application provides a communications device, configured to perform the method in the first aspect or any possible implementation of the first aspect. Specifically, the communications device may include units configured to perform the method in the first aspect or any possible implementation of the first aspect.

According to a fourth aspect, this application provides a communications device, configured to perform the method in the second aspect or any possible implementations of the second aspect. Specifically, the communications device may include units configured to perform the method in the second aspect or any possible implementation of the second aspect.

According to a fifth aspect, this application provides a communications device, and the communications device includes a memory, a processor, a transceiver, and an instruction that is stored in the memory and that can run on the processor. The memory, the processor, and the communications interface communicate with each other by using an internal connection path. The processor executes the instruction to enable the communications device to implement the method in the first aspect or any possible implementation of the first aspect.

According to a sixth aspect, this application provides a communications device, and the communications device includes a memory, a processor, a transceiver, and an instruction that is stored in the memory and that can run on the processor. The memory, the processor, and the communications interface communicate with each other by using an internal connection path. The processor executes the instruction to enable the communications device to implement the method in the second aspect or any possible implementation of the second aspect.

According to a seventh aspect, this application provides a computer readable medium, configured to store a computer program. The computer program includes an instruction used to implement the method in the first aspect or any possible implementation of the first aspect.

According to an eighth aspect, this application provides a computer readable medium, configured to store a computer program. The computer program includes an instruction used to implement the method in the second aspect or any possible implementation of the second aspect.

According to a ninth aspect, this application provides a computer program product including an instruction. When the instruction runs on a computer, the computer is enabled to implement the method in the first aspect or any possible implementation of the first aspect.

According to a tenth aspect, this application provides a computer program product including an instruction. When the instruction runs on a computer, the computer is enabled to implement the method in the second aspect or any possible implementation of the second aspect.

According to an eleventh aspect, this application provides a chip apparatus, including an input interface, an output interface, at least one processor, and a memory. The input interface, the output interface, the processor, and the memory communicate with each other by using an internal connection path. The processor is configured to execute code in the memory, and when the processor executes the code, the chip apparatus implements the method in the first aspect or any possible implementation of the first aspect.

According to a twelfth aspect, this application provides a chip apparatus, including an input interface, an output interface, at least one processor, and a memory. The input interface, the output interface, the processor, and the memory communicate with each other by using an internal connection path. The processor is configured to execute code in the memory, and when the processor executes the code, the chip apparatus implements the method in the second aspect or any possible implementation of the second aspect.

BRIEF DESCRIPTION OF THE DRAWINGS

FIG. 1 is a schematic diagram of an application scenario according to an embodiment of this application;

FIG. 2 is a schematic diagram of a manner of labeling ports at two ends of a network cable according to an embodiment of this application;

FIG. 3 is a schematic flowchart of a port configuration method according to an embodiment of this application;

DETAILED DESCRIPTION OF ILLUSTRATIVE EMBODIMENTS

Figure 4:
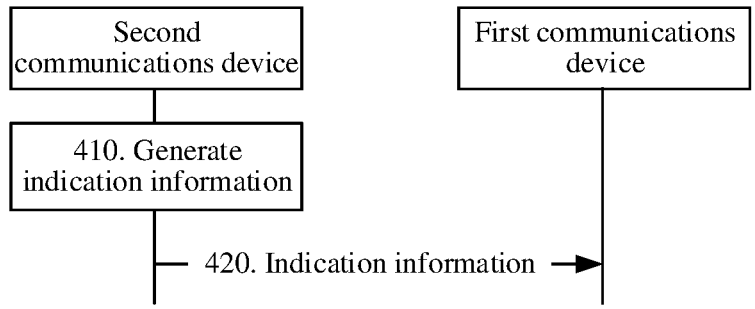
FIG. 4 is a schematic flowchart of a port configuration method according to an embodiment of this application.

The following describes the technical solutions in this application with reference to the accompanying drawings.

FIG. 1 is a schematic diagram of an application scenario according to an embodiment of this application. As shown in FIG. 1, a communications device A and a communications device B are two communications devices that need to be connected to each other on a layer-3 network deployed in a data center. The communications device A and the communications device B each include at least one port (FIG. 1 shows a port 1 of the communications device A and a port 2 of the communications device B).

Specifically, after it is determined that a communication connection needs to be established between the port 1 of the communications device A and the port 2 of the communications device B, IP addresses need to be configured for both the port 1 and the port 2, and an IP address 1 configured for the port 1 and an IP address 2 configured for the port 2 need to be on a same subnet to implement layer 2 interworking between the communications device A and the communications device B. After the layer 2 interworking, the communications device A and the communications device B may implement route transmission by using a border gateway protocol (external border gateway protocol, BGP) or the like, to implement packet forwarding between the communications device A and the communications device B.

It should be understood that the communications device A and the communications device B in this embodiment of this application each may be any communications device that needs to establish a connection to another communications device through a port configuration. This embodiment of this application imposes no limitation thereto.

For example, the communications device A and/or the communications device B each may be a switch type device (for example, a switch) or a non-switch type device (for example, a server).

It should be understood that FIG. 1 shows only an example of the communications device A and the communications device B on the layer-3 network. The layer-3 network may further include another communications device. This embodiment of this application is not limited thereto.

It should be further understood that FIG. 1 shows only an example in which the communications device A includes the port 1 and the communications device B includes the port 2. The communications device A and the communications device B each may further include another quantity of ports. This embodiment of this application is not limited thereto.

The data center is currently deployed in a manner of labeling two ends of a network cable, to prevent a port connection error. An existing deployment solution includes the following steps:

First, during network planning, a network designer determines two specific ports of two specific switches that need to be connected. For example, during deployment, the network designer determines that a port 1 of a switch A and a port 2 of a switch B need to be connected.

Next, network deployment personnel attach labels to both ends of a network cable. The labels on both the ends indicate a switch number and a port number of a local end, and a switch number and a port number of a peer end of the network cable. For example, the network deployment personnel attach labels to a network cable that connects the port 1 of the switch A and the port 2 of the switch B. The labels may be marked in a manner shown in FIG. 2.

Then, the network deployment personnel respectively connect the two ends of the network cable to corresponding ports of corresponding switches based on indications of the labels on the network cable. For example, the network deployment personnel may connect one end of the network cable to the port 1 of the switch A, and connect the other end of the network cable to the port 2 of the switch B based on the labels shown in FIG. 2.

Finally, network O&M personnel configure IP addresses on a same subnet for the ports at the two ends based on the ports configured to connect the two ends during network planning.

However, in the existing deployment solution, network cabling between switches is manually deployed, and a connection error cannot be completely avoided during manual cabling. In addition, as a network scale expands, a quantity of switches and a quantity of network cables continuously increase, and a possibility of a cabling error also increases.

In this way, once ports of a network cable between switches are incorrectly connected during network deployment, IP addresses of the ports at two ends may be not on a same subnet. Consequently, an ARP disconnection is caused between the ports, a BGP connection cannot be established, and a route between the switches cannot properly work.

A port configuration method and a communications device provided in the embodiments of this application can avoid a problem that a route between two communications devices cannot properly work because an error occurs in ports through which the two communications devices are manually connected.

FIG. 3 is a schematic flowchart of a port configuration method 300 according to an embodiment of this application. The method 300 may be applied to the application scenario shown in FIG. 1.

S310. A first communications device obtains an identifier of a second port group of a second communications device, where the identifier of the second port group is used to indicate configuration information of a first port of the first communications device, and the first communications device establishes a connection to a second port in the second port group by using the first port, where the first port is any port of the first communications device, the second port is any port in the second port group, and the configuration information includes an internet protocol IP address.

S320. The first communications device determines the configuration information of the first port based on the identifier of the second port group.

S330. The first communications device configures the configuration information for the first port.

It should be understood that the first communications device may be either of the communications device A and the communications device B in FIG. 1, and the second communications device may be a communications device in FIG. 1 other than a communications device corresponding to the first communications device.

It should be further understood that the first communications device may include at least one port, and the at least one port of the first communications device may be grouped into at least one port group. The first communications device can configure an identifier of each of the at least one port group and information (such as a port number) about a port included in the port group.

Similarly, the second communications device may include at least one port, and the at least one port of the second communications device may also be grouped into at least one port group.

It should be further understood that the port group (including a first port group or the second port group) in this embodiment of this application may include one or more ports.

For example, the first communications device includes three port groups: a port group 1, a port group 2, and a port group 3. The port group 1 has an identifier in and includes a port 1 to a port 4. The port group 2 has an identifier 112 and includes a port 5 to a port 8. The port group 3 has an identifier 113 and includes a port 9 and a port 10.

For another example, the first communications device includes three port groups: a port group 1, a port group 2, and a port group 3. The port group 1 has an identifier in and includes a port 1 to a port 4. The port group 2 has an identifier 112 and includes a port 5. The port group 3 has an identifier 113 and includes a port 6.

Optionally, an identifier of the port group of the first communications device may be understood as a logical identifier of the first communications device.

In other words, the first communications device can configure the logical identifier of the first communications device and a port corresponding to the logical identifier, that is, a port for which the logical identifier is valid.

For example, the first communications device includes three logical identifiers: a logical identifier 111, a logical identifier 112, and a logical identifier 113. The logical identifier in corresponds to the port 1 to the port 4, the logical identifier 112 corresponds to the port 5 to the port 8, and the logical identifier 113 corresponds to the port 9 and the port 10.

For another example, the first communications device includes three logical identifiers: a logical identifier 111, a logical identifier 112, and a logical identifier 113. The logical identifier in corresponds to the port 1 to the port 4, the logical identifier 112 corresponds to the port 5, and the logical identifier 113 corresponds to the port 6.

Optionally, when the first communications device includes only one port group, an identifier of the port group may be the logical identifier of the first communications device, a device identifier of the first communications device (for example, a physical identifier of the first communications device), or another existing field or newly added field that can uniquely identify the first communications device. This embodiment of this application imposes no limitation thereto.

It should be understood that, that the first communications device establishes the connection to the second port in the second port group by using the first port in S310 may mean that the first port of the first communications device is connected to the second port of the second communications device by using a network cable, or the first communications device establishes a physical connection to the second communications device.

Optionally, in S310, the first communications device may obtain the identifier of the second port group of the second communications device in a plurality of manners. This embodiment of this application imposes no limitation thereto.

In a possible implementation, the first communications device may receive indication information from the second communications device, and the indication information is used to indicate the identifier of the second port group.

In other words, the first communications device can receive, after being connected to a port at a peer end, an identifier (or a logical identifier) of a port group sent by the peer end. Correspondingly, the first communications device can further send, to the peer end by using a port of a local end, an identifier (or a logical identifier) of a port group to which the port of the local end belongs.

It should be understood that, after establishing the connection to the second communications device, the first communications device may exchange identifiers (or logical identifiers) of port groups by using an underlying protocol.

Optionally, the underlying protocol may be an existing protocol such as an LLDP protocol or a MAC protocol, or may be a newly added protocol. This embodiment of this application imposes no limitation thereto.

For example, the indication information may be carried in a device identifier field in a link layer discovery protocol LLDP packet or a reserved field in the LLDP packet.

In another possible implementation, the first communications device may receive indication information from another communications device. The indication information is used to indicate the identifier of the second port group, and the another communications device is configured to manage the first communications device and the second communications device.

In still another possible implementation, the first communications device may determine the identifier of the second port group based on a preconfigured third mapping relationship. The third mapping relationship is used to indicate a correspondence between the identifier of the first port group and the identifier of the second port group.

In other words, the preconfigured third mapping relationship indicates that a physical connection between the first communications device and the second communications device is established by using a port in the first port group of the first communications device and a port in the second port group of the second communications device.

Optionally, the first communications device may further respectively configure a specific port in a port group in the first communications device and a specific port in a port group in another communications device through which a physical connection is established between the first communications device and the another communications device. This embodiment of this application imposes no limitation thereto.

Optionally, in S320, the first communications device may determine the configuration information of the first port in a plurality of manners. This embodiment of this application imposes no limitation thereto.

Scenario 1: The first communications device includes only one port group, and the second communications device includes at least one port group.

In a possible implementation, the first communications device may determine the configuration information of the port based on the identifier of the second port group and a preconfigured first mapping relationship, and the first mapping relationship is used to indicate a correspondence between the identifier of the second port group and the configuration information.

Specifically, the first communications device may preconfigure at least one mapping relationship. Each of the at least one mapping relationship is used to indicate a correspondence between an identifier of a port group at a peer end and a port configuration of a local end. The at least one mapping relationship includes the first mapping relationship. The first communications device queries and matches in the at least one mapping relationship based on the identifier of the second port group, to find a port configuration corresponding to the identifier of the second port group. The port configuration is the configuration information of the first port.

It should be understood that a port configuration of a port in this embodiment of this application is also referred to as configuration information of the port.

It should be further understood that the mapping relationship preconfigured by the first communications device may be a logical node preconfigured by the first communications device. The logical node is not valid initially for a specific port in the first communications device, but a condition that a port at the peer end matching the logical node needs to meet (for example, an identifier/a logical identifier of a port group to which the port at the peer end matching the logical node belongs) and the port configuration (for example, an IP address) at the local end are specified.

Correspondingly, after the first port is connected to the second port, the first communications device may obtain the identifier (a logical identifier) of the second port group of the second communications device; search, based on the identifier of the second port group, a local configuration for a logical node that matches the identifier of the second port group; and adapt a port configuration in the logical node to the first port.

In other words, the first communications device can configure the logical node; configure the configuration information such as a to-be-adapted port configuration of the local end in the logical node (which is directly configured on a specific port in the prior art); and specify an identifier (or a logical identifier) of a port group at the peer end.

For example, the first communications device may preconfigure a mapping relationship table shown in Table 1.

TABLE 1

| Logical identifier of the peer end | Port configuration of the local end |
| --- | --- |
| 211 | 182.111.211.111 255.255.255.0 |
| 212 | 182.111.212.111 255.255.255.0 |
| 311 | 182.112.221.112 255.255.255.0 |

As shown in Table 1, the second communications device includes a logical identifier 211 and a logical identifier 212. The logical identifier 211 (in other words, an identifier 211 of the second port group) includes the second port when being valid. A third communications device includes a logical identifier 311.

As shown by the underline in Table 1, when the first communications device obtains the logical identifier 211, the first communications device queries Table 1 based on the logical identifier 211 of the peer end, to obtain an IP address corresponding to the logical identifier 211 of the peer end. In other words, the configuration information of the first port is 182.111.211.111.255.255.255.0.

Optionally, each row in Table 1 may be understood as a mapping relationship or a logical node configured by the first communications device.

Scenario 2: The first communications device includes at least one port group, the at least one port group includes a first port group, the first port is any port in the first port group, and the second communications device includes at least one port group.

Optionally, in S320, the first communications device may determine the configuration information based on the identifier of the second port group and an identifier of the first port group.

In a possible implementation, the first communications device may determine the configuration information based on the identifier of the second port group, the identifier of the first port group, and a preconfigured second mapping relationship, and the second mapping relationship is used to indicate a correspondence between the identifier of the second port group, the identifier of the first port group, and the configuration information.

Specifically, the first communications device may preconfigure at least one mapping relationship. Each of the at least one mapping relationship is used to indicate a correspondence between an identifier of a port group at a peer end, an identifier of a port group at a peer end, and a port configuration of a local end. The at least one mapping relationship includes the first mapping relationship. The first communications device queries and matches in the at least one mapping relationship based on the identifier of the second port group and the identifier of the first port group, to find a port configuration corresponding to both the identifier of the second port group and the identifier of the first port group. The port configuration is the configuration information of the first port.

It should be further understood that the mapping relationship preconfigured by the first communications device may be a logical node preconfigured by the first communications device. The logical node is not valid initially for a specific port in the first communications device, but a condition that a port at a peer end matching the logical node needs to meet (for example, an identifier/a logical identifier of a port group to which the port at the peer end matching the logical node belongs), a port at the local end, and the port configuration (for example, an IP address) at the local end are specified.

Correspondingly, after the first port is connected to the second port, the first communications device may obtain the identifier (the logical identifier) of the second port group of the second communications device; search, based on the identifier of the first port group to which the first port belongs and the identifier of the second port group, a local configuration for a logical node that matches the identifier of the first port group and the identifier of the second port group; and adapt a port configuration in the logical node to the first port.

In other words, the first communications device can configure the logical node; configure the configuration information such as a to-be-adapted port configuration of the local end in the logical node (which is directly configured on a specific port in the prior art); and specify an identifier (or a logical identifier) of a port group at the peer end.

For example, the first communications device may preconfigure a mapping relationship table shown in Table 2.

TABLE 2

| Logical identifier of the local end | Logical identifier of the peer end | Port configuration of the local end |
|---|---|---|
| 111 | 211 | 182.111.211.111 255.255.255.0 |
| <u>112</u> | <u>212</u> | <u>182.111.212.111 255.255.255.0</u> |
| 113 | 311 | 182.112.221.112 255.255.255.0 |

As shown in Table 2, the first communications device includes a logical identifier 111, a logical identifier 112, and a logical identifier 113. The logical identifier 112 (in other words, an identifier 112 of the first port group) includes the first port when being valid. The second communications device includes a logical identifier 211 and a logical identifier 212. The logical identifier 212 (in other words, an identifier 212 of the second port group) includes the second port when being valid. A third communications device includes a logical identifier 311.

As shown by the underline in Table 2, when the first communications device obtains the logical identifier 212, the first communications device queries Table 2 based on the logical identifier 212 of the peer end and the logical identifier 112 of the local end, to obtain an IP address corresponding to the logical identifier 212 of the peer end and an IP address corresponding to the logical identifier 112 of the local end. In other words, the configuration information of the first port is 182.111.212.111 255.255.255.0.

Optionally, each row in Table 2 may be understood as a mapping relationship or a logical node configured by the first communications device.

It should be understood that Table 1 and Table 2 merely show examples of an implementable form of the mapping relationship preconfigured by the first communications device. However, the mapping relationship preconfigured by the first communications device is not limited to a form of a table, and may also be in another form, for example, a mapping relationship tree. This embodiment of this application imposes no limitation thereto.

According to the port configuration method provided in this embodiment of this application, the first communications device may obtain the identifier of the second port group of the second communications device. The identifier of the second port group is used to indicate the configuration information of the first communications device. The first communications device establishes the connection to the second port in the second port group by using the first port. The first port is any port of the first communications device, and the second port is any port in the second port group. The first communications device determines the configuration information of the first port based on the identifier of the second port group, and configures the configuration information for the first port.

To be specific, in a network planning phase, a network designer only needs to plan a connection relationship between communications devices, and does not need to specify a connection relationship between ports. Correspondingly, in a network deployment phase, network deployment personnel only need to ensure that switches are correctly connected, and does not need to concern about whether ports used for connecting the switches are correctly connected. Therefore, this can avoid a problem that a route between two communications devices cannot properly work because an error occurs in ports through which the two communications devices are manually connected.

FIG. 4 is a schematic flowchart of a port configuration method 400 according to an embodiment of this application. As shown in FIG. 4, the method 400 may be applied to the application scenario shown in FIG. 1.

S410. A second communications device generates indication information, where the indication information is used to indicate an identifier of a second port group; and the second communications device establishes a connection to a first port of a first communications device by using a second port in the second port group, where the identifier of the second port group is used to indicate configuration information of the first port of the first communications device, the first port is any port of the first communications device, the second port is any port in the second port group, and the configuration information includes an internet protocol IP address.

S420. The second communications device sends the indication information to the first communications device, and correspondingly the first communications device receives the indication information from the second communications device.

It should be understood that the second communications device may be either of the communications device A and the communications device B in FIG. 1, and the first communications device may be a communications device in FIG. 1 other than a communications device corresponding to the second communications device.

Optionally, the second communications device may include at least one port, and the at least one port of the second communications device may be grouped into at least one port group. The at least one port group includes the second port group. The second communications device can configure an identifier of each of the at least one port group and information (such as a port number) about a port included in the port group.

Similarly, the first communications device may include at least one port, and the at least one port of the first communications device may also be grouped into at least one port group.

It should be further understood that the port group (including a first port group or the second port group) in this embodiment of this application may include one or more ports.

For example, the second communications device includes three port groups: a port group 1, a port group 2, and a port group 3. The port group 1 has an identifier 211 and includes a port 1 to a port 4. The port group 2 has an identifier 212 and includes a port 5 to a port 8. The port group 3 has an identifier 213 and includes a port 9 and a port 10.

For another example, the second communications device includes three port groups: a port group 1, a port group 2, and a port group 3. The port group 1 has an identifier 211 and includes a port 1 to a port 4. The port group 2 has an identifier 212 and includes a port5. The port group 3 has an identifier 213 and includes a port 6.

Optionally, the identifier of the port group of the second communications device may be understood as a logical identifier of the second communications device.

In other words, the second communications device can configure the logical identifier of the second communications device and a port corresponding to the logical identifier, that is, a port for which the logical identifier is valid.

For example, the second communications device includes three logical identifiers: a logical identifier 211, a logical identifier 212, and a logical identifier 213. The logical identifier 211 corresponds to the port 1 to the port 4, the logical identifier 212 corresponds to the port 5 to the port 8, and the logical identifier 213 corresponds to the port 9 and the port 10.

For another example, the second communications device includes three logical identifiers: a logical identifier 211, a logical identifier 212, and a logical identifier 213. The logical identifier 211 corresponds to the port 1 to the port 4, the logical identifier 212 corresponds to the port 5, and the logical identifier 213 corresponds to the port 6.

Optionally, when the second communications device includes only one port group, an identifier of the port group may be the logical identifier of the second communications device, a device identifier of the second communications device (for example, a physical identifier of the second communications device), or another existing field or newly added field that can uniquely identify the second communications device. This embodiment of this application imposes no limitation thereto.

It should be understood that, that the second communications device establishes the connection to the first port of the first communications device by using the second port in the second port group in S410 may mean that the second port of the second communications device is connected to the first port of the first communications device by using a network cable, or the second communications device establishes a physical connection to the first communications device.

It should be understood that, after being connected to a port at a peer end, the second communications device can send, to the peer end by using a port at a local end, an identifier (or a logical identifier) of a port group to which the port at the local end belongs. Correspondingly, the second communications device can further receive an identifier (or a logical identifier) of a port group sent by the peer end.

It should be understood that, after establishing the connection to the first communications device, the second communications device may exchange identifiers (or logical identifiers) of port groups by using an underlying protocol.

Optionally, the underlying protocol may be an existing protocol such as an LLDP protocol or a MAC protocol, or may be a newly added protocol. This embodiment of this application imposes no limitation thereto.

For example, the indication information may be carried in a device identifier field in a link layer discovery protocol LLDP packet or a reserved field in the LLDP packet.

Optionally, after S420, the first communications device may perform steps performed by the second communications device in FIG. 3, to determine the configuration information of the first port and configure the first port. Details are not described herein again.

According to the port configuration method provided in this embodiment of this application, the second communications device sends the indication information to the first communications device, where the indication information is used to indicate the identifier of the second port group; the second communications device establishes the connection to the first port of the first communications device by using the second port in the second port group, where the identifier of the second port group is used to indicate the configuration information of the first port of the first communications device, the first port is any port of the first communications device, and the second port is any port in the second port group, so that the first communications device may determine the configuration information of the first port based on the identifier of the second port group. Therefore, this can avoid a problem that a route between two communications devices cannot properly work because an error occurs in ports through which the two communications devices are manually connected.

Figure 5:
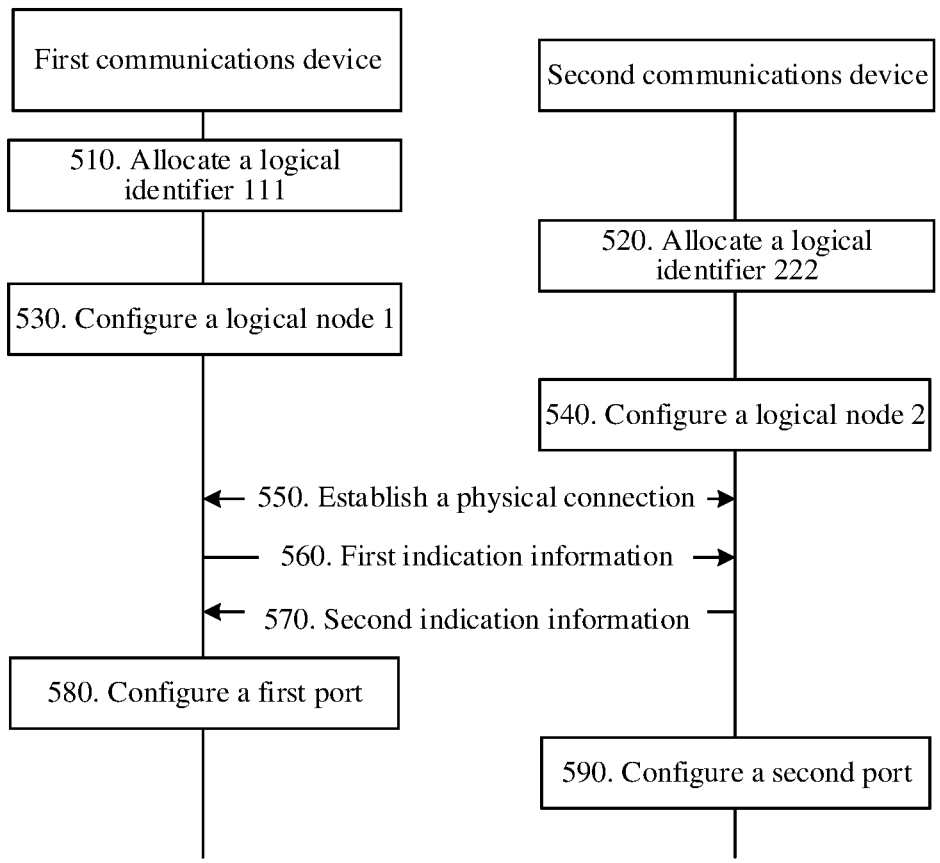
FIG. 5 is a schematic flowchart of another port configuration method according to an embodiment of this application.

FIG. 5 is a schematic flowchart of a port configuration method 500 according to an embodiment of this application. As shown in FIG. 5, the method 500 may be applied to the application scenario shown in FIG. 1.

It should be noted that, in a network planning phase, a network designer plans that the first communications device needs to be connected to the second communications device, an IP address of a port that is on the first communications device and that is used to connect the second communications device is 172.1.112.11/24, and an IP address of a port that is on the second communications device and that is used to connect to the first communications device is 172.1.112.12/24.

S501. The first communications device allocates a logical identifier 111 to the first communications device.

Optionally, the logical identifier 111 may be configured in the first communications device by using an extended command line interface (command line interface, CLI), a network configuration (network configuration, NETCONF) protocol, or the like.

S502. The second communications device allocates a logical identifier 222 to the second communications device.

Optionally, the logical identifier 222 may be configured in the second communications device by using an extended command line interface (CLI), a NETCONF, or the like.

It should be noted that S501 is a procedure in which the first communications device configures a logical identifier, and S502 is a procedure in which the second communications device configures a logical identifier. An execution sequence of S501 and S502 is not limited in this embodiment of this application.

S503. The first communications device configures a logical node 1 for the first communications device, where a logical identifier of a peer end that matches the logical node 1 and an IP address of a port at a local end corresponding to the logical identifier of the peer end are configured on the logical node 1.

For example, the first communications device configures the IP address of the port of the local end on the logical node 1 by using a command "local ip 172.1.112.11/24", and configures the logical identifier of the peer end on the logical node 1 by using a command "peer switch logic id 222".

Optionally, the first logical node may be configured in the first communications device by using a CLI, a NETCONF, or the like of an extended switch.

S504. The second communications device configures a logical node 2 for the second communications device, where a logical identifier of a peer end that matches the logical node 2 and an IP address of a port at a local end corresponding to the logical identifier of the peer end are configured on the logical node 2.

For example, the second communications device configures the IP address of the port at the local end on the logical node 2 by using a command "local ip 172.1.112.22/24", and configures the logical identifier of the peer end on the logical node 2 by using a command "peer switch logic id 111".

Optionally, the second logical node may be configured in the second communications device by using a CLI, a NETCONF, or the like of an extended switch.

It should be noted that S503 is a procedure in which the first communications device configures a logical node, and S504 is a procedure in which the second communications device configures a logical node. An execution sequence of S503 and S504 is not limited in this embodiment of this application.

S505. The first communications device establishes a physical connection to the second communications device.

For example, network deployment personnel connect one end of a network cable to a port A of the first communications device, and connects the other end of the network cable to a port B of the second communications device.

S506. The first communications device sends first indication information to the second communications device, where the first indication information is used to indicate the logical identifier 111. Correspondingly, the second communications device receives the first indication information from the first communications device.

Optionally, the first indication information may be carried in a first LLDP packet.

For example, the first indication information may be carried in a reserved field in the first LLDP packet, the reserved field is set to a logical identifier field, and a value of the logical identifier field is the logical identifier 111.

For another example, the first indication information may be carried in a device identifier field in the first LLDP packet, and a value of the device identifier field is the logical identifier 111.

S507. The second communications device sends second indication information to the first communications device, where the second indication information is used to indicate the logical identifier 222. Correspondingly, the first communications device receives the second indication information from the second communications device.

Optionally, the second indication information may be carried in a second LLDP packet.

For example, the second indication information may be carried in a reserved field in the second LLDP packet, the reserved field is set to a logical identifier field, and a value of the logical identifier field is the logical identifier 222.

For another example, the second indication information may be carried in a device identifier field in the second LLDP packet, and a value of the device identifier field is the logical identifier 222.

It should be understood that an existing LLDP packet includes a device identifier (chassis identifier, Chassis ID) field, a port identifier (port ID) field, a time to live (time to live) field, a link layer discovery protocol data unit (link layer discovery protocol data unit, LLDPDU) end identifier field, and a reserved field.

Optionally, the first indication information and the second indication information may be alternatively carried in a packet in another existing protocol or a packet in a newly added protocol. This embodiment of this application imposes no limitation thereto.

It should be noted that S506 is a procedure in which the first communications device notifies the second communications device of a logical identifier, and S507 is a procedure in which the second communications device notifies a logical identifier. An execution sequence of S506 and S507 is not limited in this embodiment of this application.

S508. The second communications device finds the matched logical node 2 in a local configuration based on the logical identifier 111 indicated by the first indication information, and then configures, on the port B, an IP address 172.1.112.22/24 of a port at the local end configured on the logical node 2.

S509. The first communications device finds the matched logical node 1 in the local configuration based on the logical identifier 222 indicated by the second indication information, and then configures, on the port A, an IP address 172.1.112.11/24 of a port at the local end configured on the logical node 1.

It should be noted that S508 is a procedure in which the first communications device configures a port, and S509 is a procedure in which the second communications device configures a port. An execution sequence of S508 and S509 is not limited in this embodiment of this application.

With reference to FIG. 2 to FIG. 5, the foregoing describes the port configuration methods provided in the embodiments of this application. With reference to FIG. 6 to FIG. 9, the following describes communications devices provided in embodiments of this application.

Figure 6:
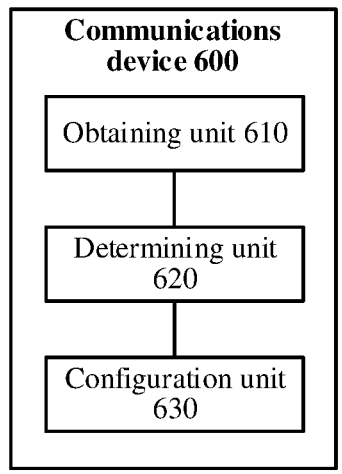
FIG. 6 is a schematic block diagram of a communications device according to an embodiment of this application.

FIG. 6 is a schematic block diagram of a communications device 300 according to an embodiment of this application. The communication 300 includes: an obtaining unit 610, configured to obtain an identifier of a second port group of a second communications device, where the identifier of the second port group is used to indicate configuration information of a first port of the communications device, and the communications device establishes a connection to a second port in the second port group by using the first port, the first port is any port of the communications device, the second port is any port in the second port group, and the configuration information includes an internet protocol IP address; a determining unit 620, configured to determine the configuration information of the first port based on the identifier of the second port group obtained by the obtaining unit 610;

and a configuration unit 630, configured to configure, for the first port, the configuration information determined by the determining unit 620.

Optionally, the determining unit is specifically configured to determine the configuration information of the port based on the identifier of the second port group and a preconfigured first mapping relationship, where the first mapping relationship is used to indicate a correspondence between the identifier of the second port group and the configuration information.

Optionally, the communications device includes at least one port group, the at least one port group includes a first port group, the first port is any port in the first port group, and the determining unit is specifically configured to determine the configuration information based on the identifier of the second port group and the identifier of the first port group.

Optionally, the determining unit is specifically configured to determine the configuration information based on the identifier of the second port group, an identifier of the first port group, and a preconfigured second mapping relationship, where the second mapping relationship is used to indicate a correspondence between the identifier of the second port group, the identifier of the first port group, and the configuration information.

Optionally, when the communications device includes only the first port group, the identifier of the first port group is an identifier of the communications device.

Optionally, the communications device further includes a receiving unit. The receiving unit is configured to receive indication information sent by the second communications device, where the indication information is used to indicate the identifier of the second port group.

Optionally, the indication information is carried in a device identifier field in a link layer discovery protocol LLDP packet or a reserved field in the LLDP packet.

It should be understood that the communications device 60o herein is implemented in a form of a function unit. The term "unit" herein may be an application-specific integrated circuit (application specific integrated circuit, ASIC), an electronic circuit, a processor (for example, a shared processor, a special purpose processor, or a group processor) configured to execute one or more software or firmware programs, a memory, a combinational logic circuit, and/or other appropriate components that support the described functions. In an optional example, a person skilled in the art may understand that the communications device 600 may be specifically the first communications device in the embodiments of the method 300 to the method 500. The communications device 600 may be configured to perform procedures and/or steps corresponding to the first communications device in the embodiments of the method 300 to the method 500. To avoid repetition, details are not described herein again.

Figure 7:
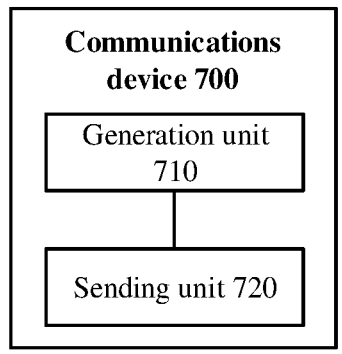
FIG. 7 is a schematic block diagram of another communications device according to an embodiment of this application.

FIG. 7 is a schematic block diagram of a communications device 700 according to an embodiment of this application. The communications device 700 includes: a generation unit 710, configured to: generate indication information, where the indication information is used to indicate an identifier of a second port group; the communications device establishes a connection to a first port of a first communications device by using a second port in the second port group, where the identifier of the second port group is used to indicate configuration information of the first port of the first communications device, the first port is any port of the first communications device, the second port is any port in the second port group, and the configuration information includes an internet protocol IP address; and a sending unit 720, configured to send the indication information generated by the generation unit 710 to the first communications device.

Optionally, the second communications device includes at least one port group, and the at least one port group includes the second port group.

Optionally, when the second communications device includes only the second port group, the identifier of the second port group is an identifier of the second communications device.

Optionally, the indication information is carried in a device identifier field in a link layer discovery protocol LLDP packet or a reserved field in the LLDP packet.

It should be understood that the communications device 700 herein is implemented in a form of a function unit. The term "unit" herein may be an ASIC, an electronic circuit, a processor (for example, a shared processor, a special purpose processor, or a group processor) configured to execute one or more software or firmware programs, a memory, a combinational logic circuit, and/or other appropriate components that support the described functions. In an optional example, a person skilled in the art may understand that the communications device 700 may be specifically the second communications device in the embodiments of the method 300 to the method 500. The communications device 700 may be configured to perform procedures and/or steps corresponding to the second communications device in the embodiments of the method 300 to the method 500. To avoid repetition, details are not described herein again.

Figure 8:
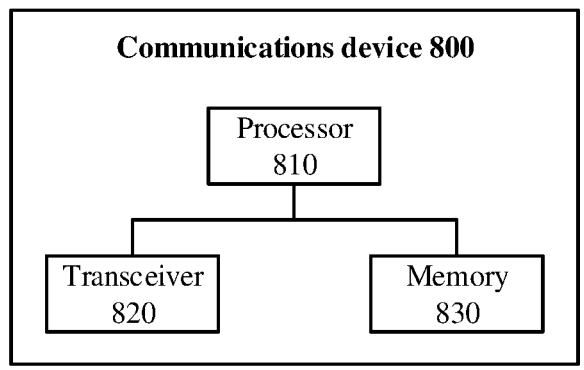
FIG. 8 is a schematic block diagram of still another communications device according to an embodiment of this application.

FIG. 8 shows a communications device 800 according to an embodiment of this application. The communications device 800 may be the first communications device in FIG. 3 to FIG. 5. The first communications device 800 may use a hardware architecture shown in FIG. 8. The apparatus may include a processor 810, a transceiver 820, and a memory 830. The processor 810, the transceiver 820, and the memory 830 communicate with each other by using an internal connection path. Related functions implemented by the determining unit 620 and the configuration unit 630 in FIG. 6 may be implemented by the processor 810, and related functions implemented by the obtaining unit 610 may be implemented by the processor 810 by controlling the transceiver 820.

The processor 810 may include one or more processors, for example, include one or more central processing units (CPU). When the processor is one CPU, the CPU may be a single-core CPU or a multi-core CPU.

The transceiver 820 is configured to send and receive data and/or information, and receive data and/or information. The transceiver may include a transmitter and a receiver. The transmitter is configured to send data and/or a signal, and the receiver is configured to receive data and/or a signal.

The memory 830 includes but is not limited to a random access memory (RAM), a read-only memory (ROM), an erasable programmable memory (EPROM), and a compact disc read-only memory (CD-ROM). The memory 530 is configured to store a related instruction and data.

The memory 930 is configured to store program code and data of the apparatus, and may be a separate device or may be integrated into the processor 510.

Specifically, the processor 810 is configured to control the transceiver to perform information/data transmission with the second communications device. For details, refer to the descriptions in the method embodiments. Details are not described herein again.

It can be understood that FIG. 8 shows only a simplified design of the apparatus. During actual application, the apparatus may further include other necessary components, including but not limited to any quantity of transceivers, processors, controllers, and memories, and all apparatuses that can implement this application shall fall within the protection scope of this application.

In a possible design, the communications device 80*o* may be replaced with a chip apparatus, for example, may be a communications chip that may be used in the apparatus, and is configured to implement related functions of the processor 810 in the apparatus. The chip apparatus may be a field programmable gate array, a dedicated integrated chip, a system chip, a central processing unit, a network processor, a digital signal processing circuit, a microcontroller, a programmable controller, or another integrated chip for implementing related functions. Optionally, the chip may include one or more memories, configured to store program code. When the code is executed, the processor is enabled to implement a corresponding function.

Figure 9:
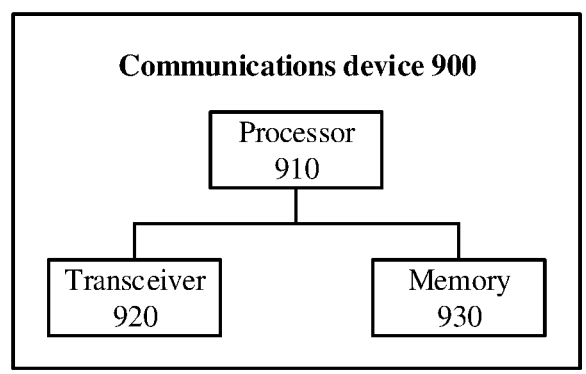
FIG. 9 is a schematic block diagram of still another communications device according to an embodiment of this application.

FIG. 9 shows a communications device 900 according to an embodiment of this application. The communications device 900 may be the second communications device in FIG. 3 to FIG. 5. The communication 900 may use a hardware architecture shown in FIG. 9. The apparatus may include a processor 910, a transceiver 920, and a memory 930. The processor 910, the transceiver 92*o*, and the memory 930 communicate with each other by using an internal connection path. Related functions implemented by the generation unit 710 in FIG. 7 may be implemented by the processor 910, and related functions implemented by the sending unit 720 may be implemented by the processor 910 by controlling the transceiver 920.

The processor 910 may include one or more processors, for example, include one or more CPUs. When the processor is one CPU, the CPU may be a single-core CPU or a multi-core CPU.

The transceiver 920 is configured to send and receive data and/or information, and receive data and/or information. The transceiver may include a transmitter and a receiver. The transmitter is configured to send data and/or information, and the receiver is configured to receive data and/or information.

The memory 930 includes but is not limited to a RAM, a ROM, an EPROM, and a CD-ROM. The memory 930 is configured to store a related instruction and data.

The memory 930 is configured to store program code and data of the apparatus, and may be a separate device or may be integrated into the processor 910.

Specifically, the processor 910 is configured to control the transceiver to perform information transmission with a first communications device. For details, refer to the descriptions in the method embodiments. Details are not described herein again.

It can be understood that FIG. 9 shows only a simplified design of the apparatus. During actual application, the apparatus may further include other necessary components, including but not limited to any quantity of transceivers, processors, controllers, and memories, and all apparatuses that can implement this application shall fall within the protection scope of this application.

In a possible design, the apparatus 900 may be replaced with a chip apparatus, for example, may be a communications chip that may be used in the apparatus, and is configured to implement related functions of the processor 910 in the apparatus. The chip apparatus may be a field programmable gate array, a dedicated integrated chip, a system chip, a central processing unit, a network processor, a digital signal processing circuit, a microcontroller, a programmable controller, or another integrated chip for implementing related functions. Optionally, the chip may include one or more memories, configured to store program code. When the code is executed, the processor is enabled to implement a corresponding function.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a first communication device, the method comprising:
receiving indication information of an identifier of a second port group of a second communication device, wherein the indication information is received via a physical connection between a first port of the first communication device and a second port in the second port group of the second communication device;
determining an internet protocol (IP) address of the first port used to receive the indication information using the identifier of the second port group, an identifier of a first port group that includes the first port, and a preconfigured first mapping relationship, wherein the preconfigured first mapping relationship comprises a correspondence between the identifier of the second port group, the identifier of the first port group, and the IP address of the first port;
in response to determining the IP address of the first port used to receive the indication information, configuring the IP address of the first port for the first port; and
communicating with the second communication device using the IP address of the first port as the IP address of the first port.

2. The method according to claim 1, wherein the first communication device comprises only the first port group, and the identifier of the first port group is an identifier of the first communication device.

3. The method according to claim 1, wherein the indication information is carried in a device identifier field in a link layer discovery protocol (LLDP) packet.

4. The method according to claim 1, wherein the first communication device and the second communication device are different devices in a layer-3 network.

5. The method according to claim 1, wherein each of the first communication device and the second communication devices is a switch or a server in a network.

6. The method according to claim 1, wherein the first communication device and the second communication device are comprised in a data center.

7. The method according to claim 1, wherein the first communication device and the second communication device are comprised in a same subnet of a layer-3 network.

8. The method according to claim 1, further comprising:
sending the identifier of the first port to the second communication device.

9. The method according to claim 1, wherein the preconfigured first mapping relationship comprises a plurality of correspondences, and each correspondence is between a respective identifier of a port group of the second communication device, a respective identifier of the first port group, and an a respective IP address of the first port, and each correspondence of the plurality of correspondences includes a different respective IP address of the first port.

10. The method according to claim 1, wherein the indication information is carried in a reserved field in a link layer discovery protocol (LLDP) packet.

11. A first communication device, comprising:
a transceiver;
a processor; and
a non-transitory computer-readable storage medium storing a program to be executed by the processor, the program including instructions for:
receiving indication information of an identifier of a second port group of a second communication device, wherein the indication information is received via a physical connection between a first port of the first communication device and a second port in the second port group of the second communication device;
determining an internet protocol (IP) address of the first port used to receive the indication information using the identifier of the second port group, an identifier of a first port group that includes the first port, and a preconfigured first mapping relationship, wherein the preconfigured first mapping relationship comprises a correspondence between the identifier of the second port group, the identifier of the first port group, and the IP address of the first port;
in response to determining the IP address of the first port used to receive the indication information, configuring the IP address of the first port for the first port; and
communicating with the second communication device using the IP address of the first port as the IP address of the first port.

12. The first communication device according to claim 11, wherein the first communication device comprises only the first port group, and the identifier of the first port group is an identifier of the first communication device.

13. The first communication device according to claim 11, wherein the indication information is carried in a device identifier field in a link layer discovery protocol (LLDP) packet.

14. The first communication device according to claim 11, wherein the indication information is carried in a reserved field in a link layer discovery protocol (LLDP) packet.

15. A non-transitory computer readable storage medium, comprising an instruction, wherein when the instruction runs on a computer, the computer causes a first communication device to:
receive indication information of an identifier of a second port group of a second communication device, wherein the indication information is received via a physical connection between a first port of the first communication device and a second port in the second port group of the second communication device;
determine an internet protocol (IP) address of the first port used to receive the indication information using the identifier of the second port group, an identifier of a first port group that includes the first port, and a preconfigured first mapping relationship, wherein the preconfigured first mapping relationship comprises a correspondence between the identifier of the second port group, the identifier of the first port group, and the IP address of the first port;
in response to determining the IP address of the first port used to receive the indication information, configure the IP address of the first port for the first port; and
communicate with the second communication device using the IP address of the first port as the IP address of the first port.

16. The non-transitory computer readable storage medium according to claim 15, wherein the first communication device comprises only the first port group, and the identifier of the first port group is an identifier of the first communication device.

17. The non-transitory computer readable storage medium according to claim 15, wherein the indication information is carried in a device identifier field in a link layer discovery protocol (LLDP) packet.

18. The non-transitory computer readable storage medium according to claim 15, wherein the indication information is carried in a reserved field in a link layer discovery protocol (LLDP) packet.

19. The non-transitory computer readable storage medium according to claim 15, wherein the first communication device and the second communication device are different devices in a layer-3 network.

20. The non-transitory computer readable storage medium according to claim 15, wherein each of the first communication device and the second communication devices is a switch or a server in a network.

\* \* \* \* \*